July 16, 1940.  F. P. CHAUSSEE  2,207,971
TIRE CHAIN
Filed Dec. 12, 1938   2 Sheets-Sheet 1

FRANCIS P. CHAUSSEE
Inventor

By Herbert E. Smith
Attorney

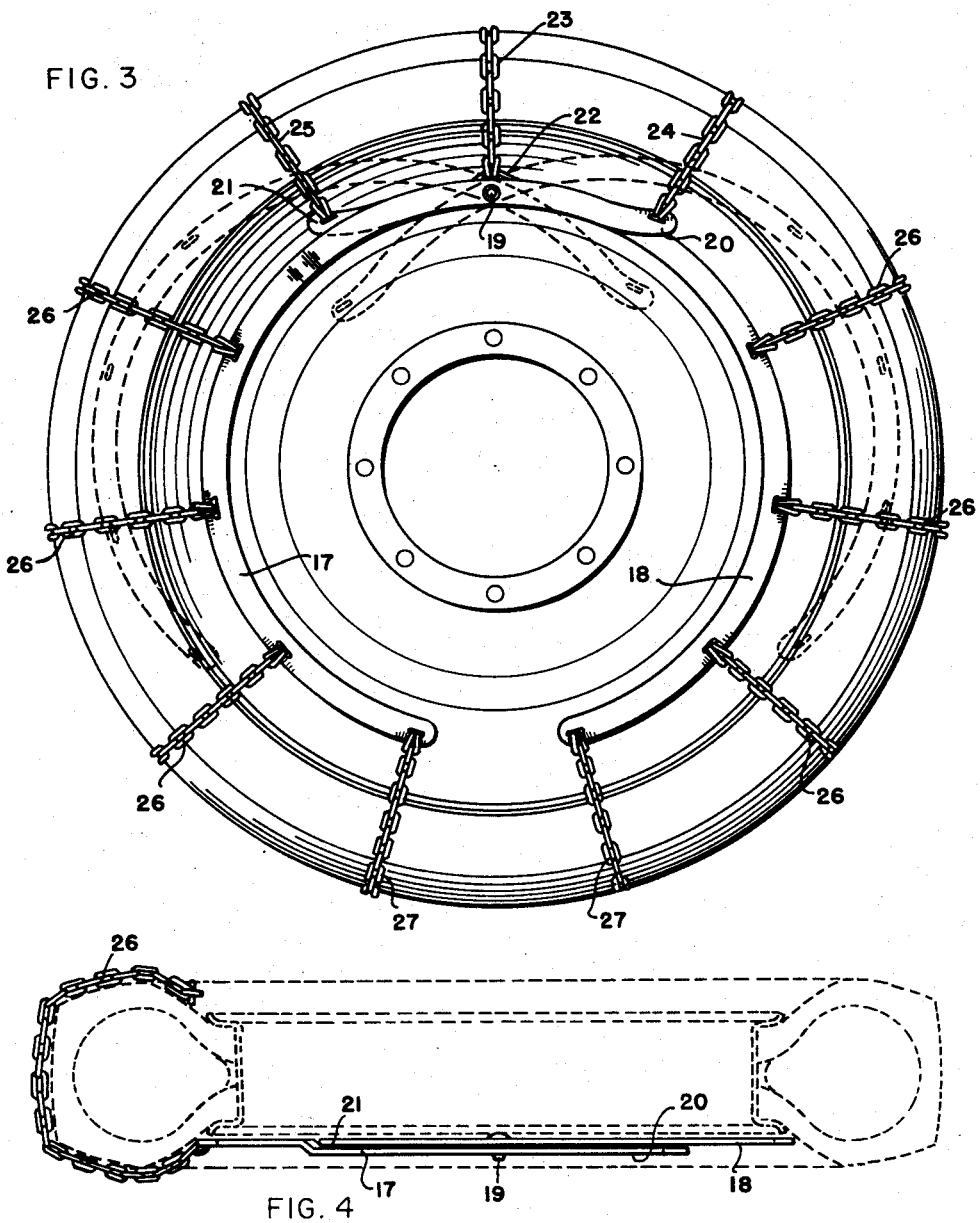

Patented July 16, 1940

2,207,971

UNITED STATES PATENT OFFICE 2,207,971

TIRE CHAIN

Francis P. Chaussee, Missoula, Mont.

Application December 12, 1938, Serial No. 245,155

3 Claims. (Cl. 152—213)

My present invention relates to an improved Tire chain of the type utilizing a number of cross chains for friction engagement with a road surface and in which one end of each chain is secured to side members, both outer and inner, ranged around the tire at approximately the wheel diameter.

A principal object of the invention is to provide in a tire chain non-skid means for use during inclement weather or for adding to the friction surface of the tire for getting out of bad places, and another principal object of the invention is to provide in a tire chain a structure that may be mounted on the tire without lifting the tire from the road surface and which may be adjusted to properly fit the chain to the tire and maintain it under proper tension.

The invention consists in certain novel combinations and arrangements of parts, together with various adjustments whereby the chain may be installed under adverse conditions and without resorting to the usual means for applying tire chains but which may, with facility, be attached in a minimum of time and with a minimum of effort and in a like manner be quickly and easily removed when no longer required.

In the accompanying drawings I have illustrated one complete example of the physical embodiment of my invention according to one mode I have thus far devised, but it will be understood that changes and alterations may be made in the exemplified structure within the scope of the appended claims without departing from the principles of the invention.

Figure 3 is an inside view of a wheel, its tire, and my chain mounted thereon; and Figure 4 is a partial view showing in dotted lines a wheel and a tire and, in full lines, the inner chain construction, together with one cross chain attached thereto.

Figure 1:
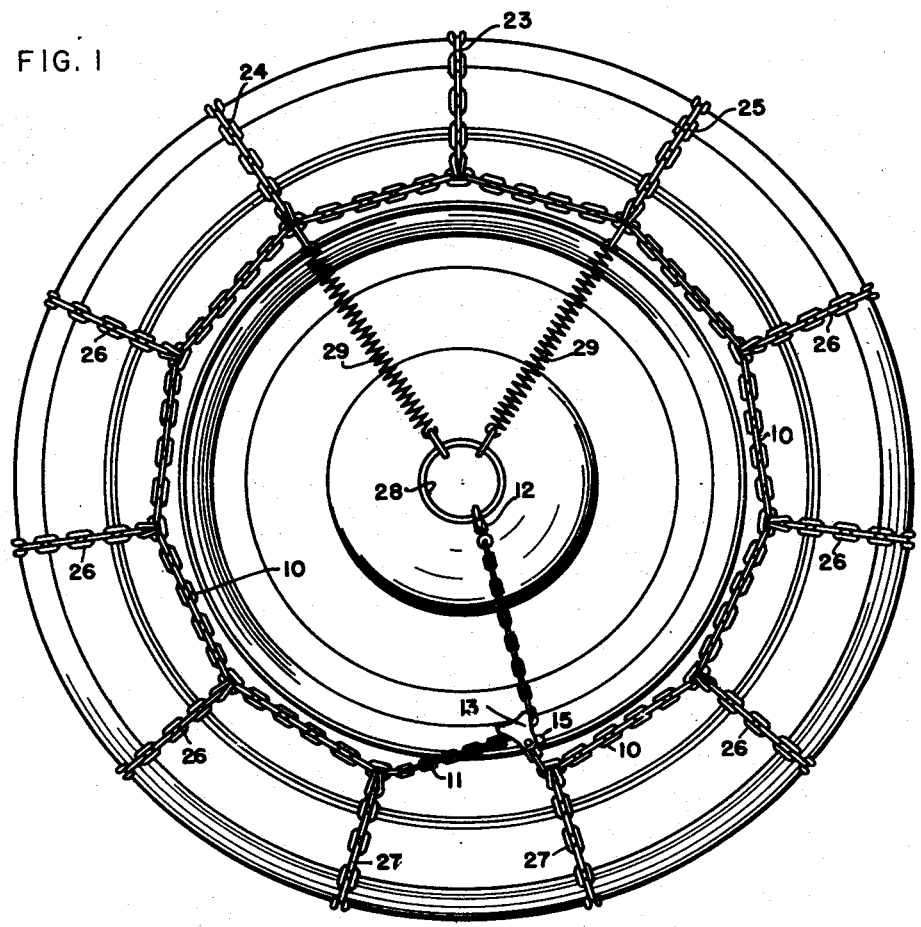
Figure 1 is an outer view of a wheel and its tire showing my chain adjusted thereto.
Figure 2:
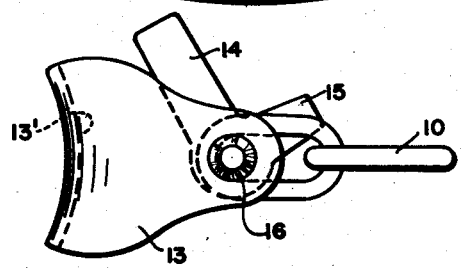
Figure 2 is a view at the terminal end of the outer side chain showing the keeper and slip serving as one securing means for the side chain.

In order that the utility of the invention and the general arrangements of parts may readily be understood I have shown in Figure 1 the conventional chain of my construction, in which an outer side chain 10 is shown equipped with the usual cross chains. At one end of the outer side chain I provide securing means as the chain 11, having a snap hook or other form of securing means as 12 on its free end. On the opposite end of this outer side chain 10 I secure a clip as 13 through which the chain 11 may be inserted to bring the two ends together, after which the hook 12 may be engaged in a ring 28 located at the approximate center of the wheel. For securing the ring 28 to enable resilient attachment of the side chain I utilize and secure a pair of tension members, as the springs 29, to this ring, one of which members engages a link adjacent the end of the cross chain 24 and the other to a ring adjacent the cross chain 25. The clip 13 is formed as a strap or yoke preferably with an inner, curved, chain-engaging surface, as 13', and in connection with the clip I provide an angular keeper having a chain-engaging leg 14 when disposed in proper position and a short extension member 15 which aids in adjusting the keeper 14. The clip 13 and the keeper 14 are secured to one end of the side chain 10 by a rivet 16 which allows free movement of the keeper and substantial fixture of the clip to the end of the chain.

Instead of the usual inner side chain I use a pair of segmental, rigid, arcuate scissor members as 17 and 18 pivoted at 19 to each other and having overlapping ends 20 and 21 constituting pull arms. Adjacent the pivot point 19 one of the arcuate members as 18 is provided with a loop as 22 to which is secured the inner end of the side chain 23. To the free ends of the pull arms 20 and 21 are secured, respectively, one end of the cross chains 24 and 25. At spaced intervals around the rest of the arcuate scissor levers are secured the inner ends of the cross chains 26 and at the ends of the arcuate members the ends of the cross chains 27. With the tire chain now constructed in the manner described, it is easy to quickly mount the chain over a tire while the tire is resting on the roadway or other ground surface.

To perform this operation with expedition the two pivoted arcuate members are spread apart in the manner indicated in the dotted lines in Figure 3. These members are then inserted over the tire with the pivot 19 coming approximately at the top of the tire, and allowed to drop into position inside the tire. In this initial adjustment the cross chain 23 rests upon the top of the tire and the arcuate members assume the position shown in the full lines of Figure 3 bringing under tension the cross chains 24 and 25 helping the arcuate members assume their proper position.

The next step is to insert the chain 11 through the clip 13 and hook it fast to the ring 28. Tension members 29 which may be springs or which may be of more rigid construction are secured to a link adjacent the cross chain 24 and the cross chain 25. These chains being attached to the overlapping ends of the arcuate members as 20 and 21 serve to hold the arcuate member in substantially fixed position according to the tension, without the necessity of securing the ends of the arcuate member and the chain, as thus mounted, is in position for use as a tire chain so long as required.

To dismount the chain it is not necessary to reach around or get under the car but my merely unfastening the snap 12 and pulling the chain through the clip 13 with the arcuate member in position as shown on the drawings, the chain may be lifted from the tire and disposed in the car against subsequent need.

If it is desired to dispense with the tension devices including the center ring 28 the chain may be turned upon itself after passing through the clip 13 and snapped into the side chain at any convenient point.

Having thus fully described my invention, what I claim as new and desire to secure by Letters Patent is:

1. A tire chain comprising a single side chain having end joining means, a pair of scissor levers fulcrumed together and having pull arms extending beyond the fulcrum, a pair of cross chains connecting said pull arms with said side chain and exerting a closing action on said scissor levers when the side chain is closed around a tire, a series of cross chains connecting said side chain with the scissor levers and limiting the extent of closure of the latter, and means cooperating with the side chain in its closed form around the tire to tension the cross chains on the tread of a tire.

2. A tire chain comprising a single side chain having end joining means, a pair of scissor levers fulcrumed together and having pull arms extending beyond the fulcrum, a single cross chain connecting between said fulcrum and the side chain, a pair of cross chains connecting said pull arms with said side chain and exerting a closing action on said scissor levers when said side chain is closed around a tire, a series of cross chains connecting said side chain with said scissor levers and limiting the extent of closure of the latter.

3. A tire chain comprising a single side chain having end joining means, a pair of scissor levers fulcrumed together and having pull arms extending beyond the fulcrum, a pair of cross chains connecting said pull arms with said side chain and exerting a closing action on said scissor levers when said side chain is closed around a tire, a series of cross chains connecting said side chain with said scissor levers and limiting the extent of closure of the latter.

FRANCIS P. CHAUSSEE.